United States Patent Office 2,701,612
Patented Feb. 8, 1955

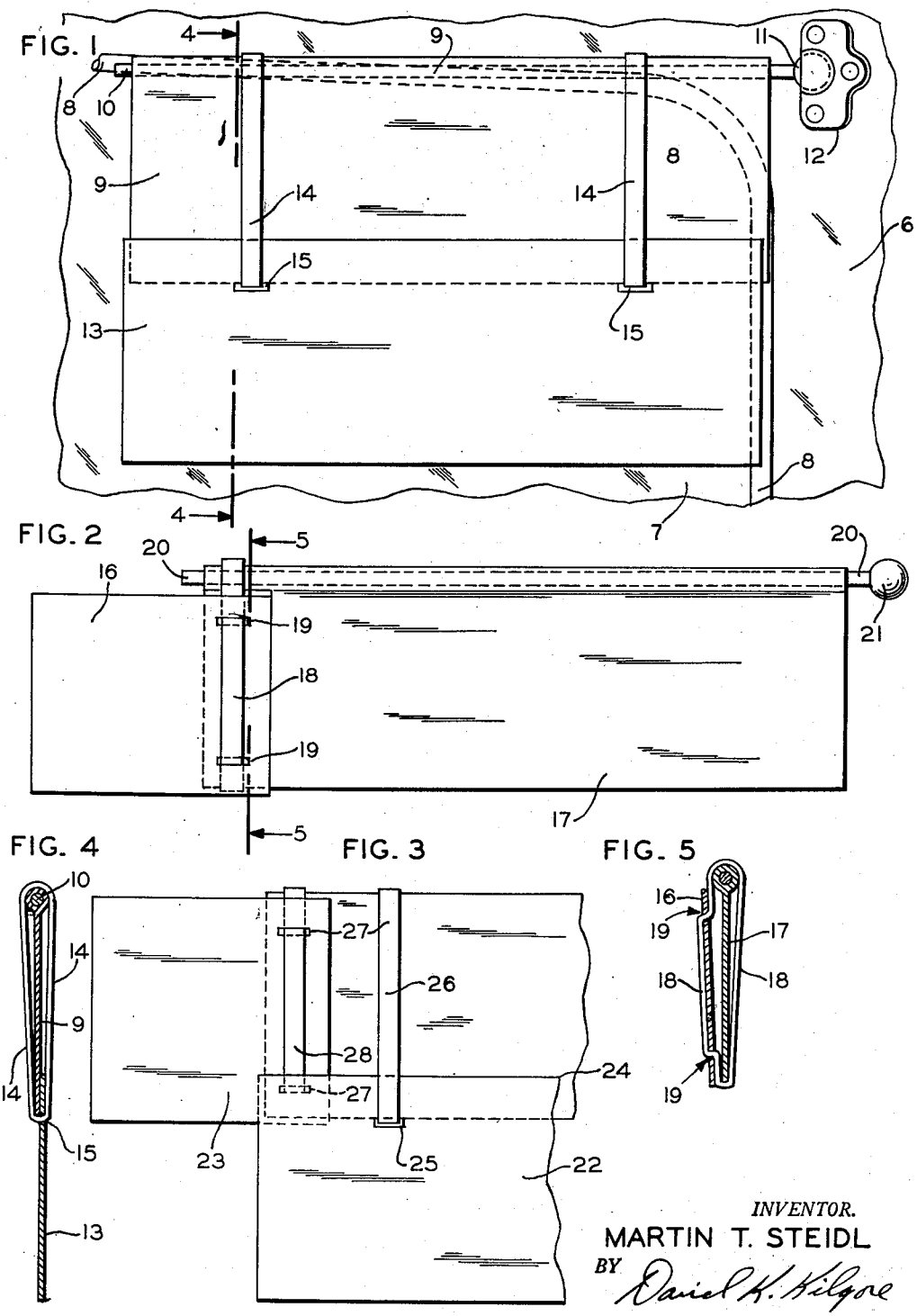
Feb. 8, 1955 — M. T. STEIDL — 2,701,612
GLARE SHIELD EXTENSION FOR AUTOMOBILES
Filed Oct. 10, 1951
INVENTOR.
MARTIN T. STEIDL
ATTORNEY

2,701,612

GLARE SHIELD EXTENSION FOR AUTOMOBILES

Martin T. Steidl, Fargo, N. Dak.

Application October 10, 1951, Serial No. 250,668

2 Claims. (Cl. 160—211)

My present invention relates to improvements in glare shields of the type mounted on the inside of an automobile for movement from inoperative position to operative positions over a given area of a wind shield or window to intercept the sun's rays or the blinding headlight of an approaching automobile.

It is well known that the glare shields which form a part of the standard equipment of an automobile cover, when in operative positions, a relatively small part of a wind shield or window and hence fail or lack in performance of the function for which they are intended.

An object of this invention is to provide extensions removably applicable to a conventional glare shield to increase the area thereof either horizontally or vertically or both.

Another object of this invention is to provide novel means for detachably securing an extension to a conventional glare shield.

Other objects of this invention will be apparent from the following description, reference being had to the drawing.

To the above end, generally stated, the invention consists of the novel devices and combination of devices hereinafter described and defined in the claims.

Referring to the drawing:

Fig. 1 is an elevational view of the glare shield applied for association with the wind shield of an automobile and having one form of the invention applied thereto;

Fig. 2 is an elevational view of a glare shield, similar to the one shown in Fig. 1, before being attached to an automobile and having attached thereto another form of the invention;

Fig. 3 is a fragmentary elevational view showing both forms of the invention as shown in Figs. 1 and 2 applied to a conventional glare shield;

Fig. 4 is a view in vertical section taken on the line 4—4 of Fig. 1; and

Fig. 5 is a view in vertical section taken on the line 5—5 of Fig. 2.

Referring first to the invention as shown in Figs. 1 and 4, wherein the numeral 6 indicates a fragment of the front end of an automobile body, looking at the same from the inside, and a fragment of a wind shield 7 and its frame 8.

Associated with the wind shield 7 is a conventional glare shield 9 attached to a horizontally disposed rod 10 which, in turn, is attached by a ball and socket joint 11 to a bearing 12 secured to the automobile body 6 at the upper right-hand end portion of the wind shield 7, whereby the extension is positively held in a plane parallel to the plane of the glare shield.

The invention, as shown in Figs. 1 and 2, consists in attaching to the glare shield 9 an extension 13 thereof to increase its width, in the form of an oblong sheet of plastic or other suitable glare-diffusing material. This extension 13 is detachably secured to the glare shield 9 by two elastic bands 14 which extend through slots 15 in said extension and transversely around said glare shield. It is important to note that the bands 14 are contracted on the longitudinal edges of the glare shield 9 and that the slots 15 are spaced below the upper edge of the extension 13. The bands 14 hold the extension 13 with the slots 15 at the lower longitudinal edge of the glare shield 9 and with that portion of the extension 13 above the slots 15 between the bands 14 and the glare shield 9 and pressed by said bands flat against the glare shield 9 so that the extension 13 is parallel to the glare shield 9.

Figs. 2 and 5 show an extension 16 for the inner end of a glare shield 17. This extension 16 is a sheet of the same material as the extension 13 and is detachably secured to the inner end portion of the glare shield 17 which it overlaps, by a single elastic band 18. The band 18 extends through upper and lower slots 19 in the extension 16 and encircles the glare shield 17. The rod 20 to which the glare shield 17 is attached has on its outer end the ball 21 of a ball and socket joint which attaches said glare shield to a bearing, not shown.

A width extension 22 and an end extension 23 identical with the extensions 13 and 16, respectively, are attached to a glare shield 24 in the same manner as the last noted extensions. The slot in the extension 22 and the elastic band are designated by the numerals 25 and 26, respectively. The numeral 27 designates the slots in the extension 23 and the numeral 28 designates the elastic band of said extension.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What I claim is:

1. An extension for a glare shield having at each end portion an aperture, and an elastic band extending through each aperture, encircling the glare shield, the elastic bands holding the extension with its apertures at the lower edge of the glare shield and with that portion of the extension above the apertures overlapping the lower portion of the glare shield and held by the elastic bands flat against the glare shield.

2. An extension for a glare shield having at each end portion an aperture, and an elastic band extending through each aperture, encircling the glare shield, the elastic bands holding the extension with its apertures at the lower edge of the glare shield and with that portion of the extension above the apertures overlapping the lower portion of the glare shield and held by the elastic bands against the glare shield.

References Cited in the file of this patent

UNITED STATES PATENTS

| | | |
|---|---|---|
| 1,518,956 | Beitman | Dec. 9, 1924 |
| 2,211,879 | Cave | Aug. 20, 1940 |
| 2,287,581 | Walker | June 23, 1942 |
| 2,528,038 | Crise | Oct. 31, 1950 |